No. 765,301.

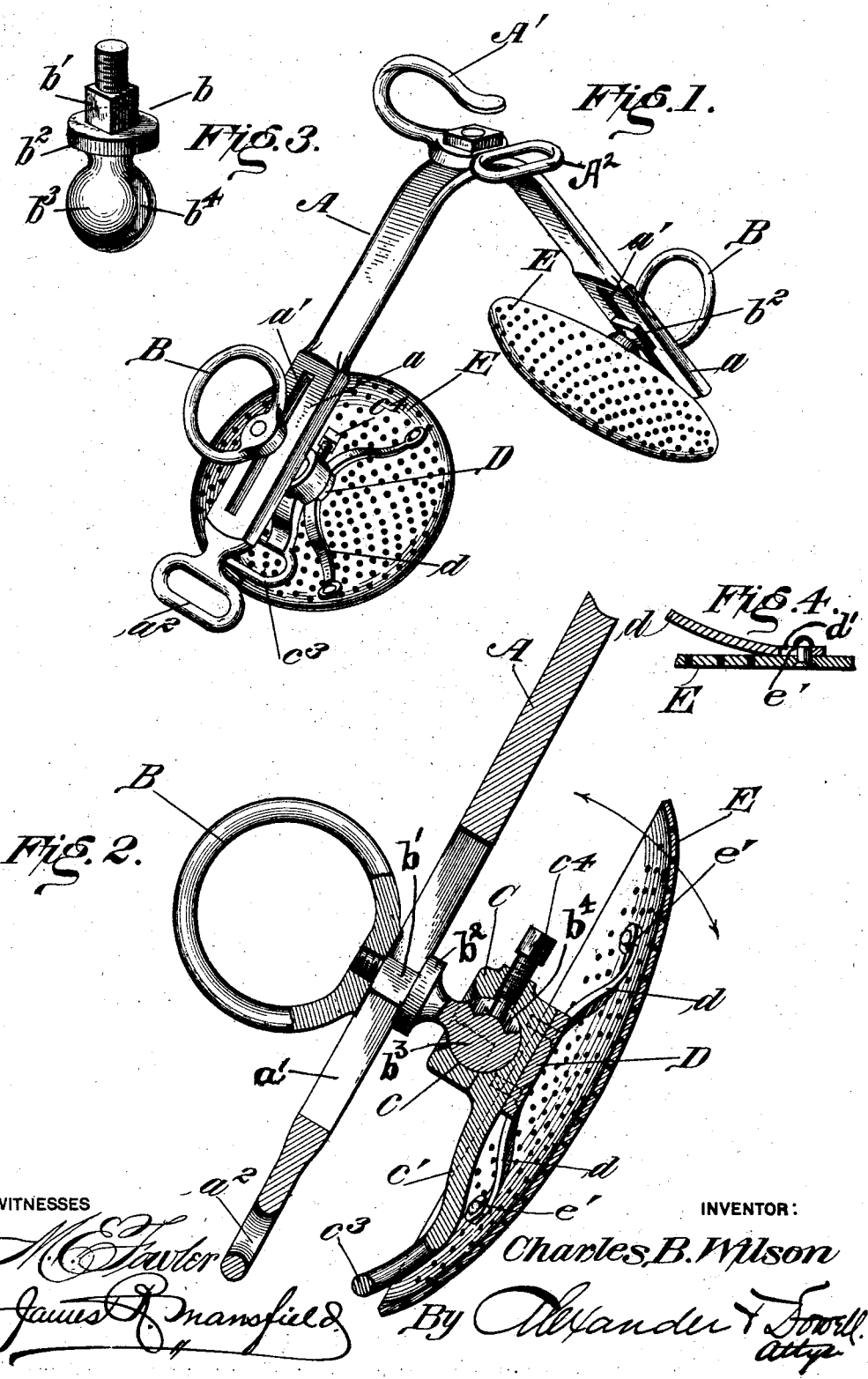

Patented July 19, 1904.

UNITED STATES PATENT OFFICE.

CHARLES B. WILSON, OF WASHINGTON, DISTRICT OF COLUMBIA.

HARNESS-SADDLE.

SPECIFICATION forming part of Letters Patent No. 765,301, dated July 19, 1904.

Application filed September 4, 1903. Serial No. 172,007. (No model.)

*To all whom it may concern:*

Be it known that I, CHARLES B. WILSON, of Washington, in the District of Columbia, have invented certain new and useful Improvements in Harness-Saddles; and I hereby declare that the following is a full, clear, and exact description thereof, reference being had to the accompanying drawings, which form part of this specification.

This invention is an improvement in back-saddles of harness; and its object is to make a saddle which will be more comfortable to the animal than those commonly employed, can be readily adjusted to fit the back of an animal, will allow for muscular movements of the animal's shoulders and back without chafing or galling, will be cool and well ventilated, and will be spring-cushioned, so that the strains and vibrations of the shafts will not affect the animal as they do in the styles of saddles commonly employed.

The invention consists in the novel construction of the saddle-iron, the saddle-pads, the connections therebetween, and in the combinations and constructions of parts hereinafter described and claimed.

The accompanying drawings illustrate an embodiment of the invention in the best form now known to me; but I do not restrict myself to the specific form therein shown; but the same will impart a clear understanding of the invention.

In said drawings, Figure 1 is a perspective view of the complete saddle. Fig. 2 is an enlarged sectional view through one of the pads and connections to saddle. Fig. 3 is a detail of the pad-attaching bolt, and Fig. 4 is a detail section of a connection between spring and pad.

A designates the saddle-iron, bent to straddle the backbone of the animal, as usual. To the top of this saddle-iron is attached the checkrein-hook A' and back-strap loop $A^2$, as usual. The lower parts $a$ of the legs of the saddle are provided with longitudinal slots $a'$, as shown, for the adjustable attachment of the pads or bearers E, and the lower extremities of the saddle-iron are provided with loops $a^2$ for the attachment of the tug-straps.

The pads or bearers E are preferably made of metal, and I propose to use aluminium for purpose of lightness, but do not restrict myself thereto. These pads may be circular in contour and concavo-convex. In practice their form and curvature should be made to approximate the surface of the portion of the animal's body with which they are to contact, so as to afford the utmost comfort to the animal. These pads are perforated, as shown, so as to afford ventilation and prevent moisture accumulating thereunder to chafe the animal. The pads are attached to spring-arms $d$, which may all branch from a plate D and form a "spider" spring. The arms $d$ are slotted, as at $d'$, to permit the springs to play slightly in relation to the pins $e'$, by which they are held to the pads. (See Fig. 4.) The springs are firmly attached to a casting C, forming the female member of a ball-and-socket connection between pad and saddle-iron, the male member or ball $b^3$ of this connection being formed on the end of a bolt $b$. The ball $b^3$ is retained in a socket $c$ in part C, as usual. This connection permits the pads to readily adjust themselves to the curvature of the animal's back and to rock independently of the saddle-iron and of each other to accommodate themselves to muscular actions of the animal's back. I prefer to restrict the motions of the pad to oscillations on a line parallel with the slot $a'$ and on a line at right angles thereto. For this purpose a bolt $c^4$ is tapped through the casting C and engages a slot $b^4$ in the ball $b^3$. (See Fig. 2.) The slot $b^4$ is long enough to allow the pad to rock longitudinally of or in line with the saddle-iron on an axis at right angles to bolt $c^4$, which permits the pad to adjust itself to the curvature of the back, and the pad can also rock transversely of or at right angles to the saddle-iron on an axis coincident with the axis of bolt $c^4$, which allows the pad to accommodate itself to the muscular actions of the animal's back. Thus the saddle-pads are self-adjusting to the animal and can independently rock under muscular actions of the back. As the pads are thus independent, the saddle should sit more firmly, ride more easily, and be far more comfortable to the animal than the common saddles.

The bolt $b$ is provided with a flange $b^2$ above the ball $b^3$ and above this flange with a squared portion $b'$, which fits in the slot $a'$ in the saddle-iron. The end of the bolt projecting above the saddle-iron is threaded for engagement of a retaining-nut, which in this instance is shown as a ring B, so as to serve the functions of a fastening-nut and of a rein-guide. By loosening nuts B the bolts can be adjusted up or down in slots $a'$, and thus adjust the pads to any desired position, the pads being secured by tightening the nuts when adjusted.

The parts C are provided with depending arms $c'$, having loops $c^3$ on their extremities for the attachment of the girth-straps by which the saddle is fastened in position.

The spring connections between the saddle-irons and the pads reduce and lessen the shocks and jars ordinarily transmitted from the shafts and reduce the liability of chafing due to such shocks and pressures.

Having thus described my invention, what I therefore claim as new, and desire to secure by Letters Patent thereon, is—

1. A harness-saddle, comprising a saddle-iron and concavo-convex bearers or pads, and means whereby the pads are attached to the legs of said saddle-iron so as to be capable of rocking longitudinally of the saddle-iron, and also at right angles thereto, and springs interposed between the pads and said attaching means, substantially as described.

2. In a harness-saddle the combination of the saddle-iron, perforated metallic plates or pads, adjustably secured to said iron, and the spider-form springs interposed between and connecting said pads and the iron, for the purpose and substantially as described.

3. In a harness-saddle the combination of the saddle-iron, ball-and-socket connections adjustably secured to said iron, pads attached to said connections, and springs interposed between said pads and the connection, and uniting the former to the latter, substantially as described.

4. A harness-saddle, comprising a saddle-iron, pads, a ball-and-socket connection between each pad and the adjacent leg of the saddle-iron, one member of said connection being attached to the pad and the other member adjustably attached to the saddle-iron, and springs interposed between the pads and the ball-and-socket connections, for the purpose and substantially as described.

5. The herein-described harness-saddle, comprising a saddle-iron having longitudinal slots in its legs; a bolt adjustably confined in each slot having a slotted ball on its lower end, a casting having a socket engaging said ball, a bolt tapped through said casting engaging the slot in the ball; and a pad attached to said casting, substantially as and for the purpose described.

6. The herein-described harness-saddle, comprising a saddle-iron having longitudinal slots in its legs; a bolt adjustably confined in each slot having a slotted ball on its lower end, a casting having a socket engaging said ball, a bolt tapped through said casting engaging the slot in the ball; a spring attached to said casting, and a perforated metallic pad attached to said spring, substantially as and for the purpose described.

In testimony that I claim the foregoing as my own I affix my signature in presence of two witnesses.

CHARLES B. WILSON.

In presence of—
ARTHUR E. DOWELL,
T. H. ALEXANDER.